(12) United States Patent
Mitsuyama et al.

(10) Patent No.: US 9,661,170 B2
(45) Date of Patent: May 23, 2017

(54) IMAGE FORMING SYSTEM THAT APPROPRIATELY PERMITS INTERRUPT PRINT, AND RECORDING MEDIUM

(71) Applicant: Kyocera Document Solutions Inc., Osaka (JP)

(72) Inventors: Kyota Mitsuyama, Osaka (JP); Koji Ikawa, Osaka (JP); Kentaro Okamoto, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/086,080

(22) Filed: Mar. 31, 2016

(65) Prior Publication Data

US 2016/0295055 A1    Oct. 6, 2016

(30) Foreign Application Priority Data

Mar. 31, 2015    (JP) ................. 2015-072674

(51) Int. Cl.
*G06F 15/00* (2006.01)
*H04N 1/00* (2006.01)

(52) U.S. Cl.
CPC ..... *H04N 1/00915* (2013.01); *H04N 1/00307* (2013.01); *H04N 1/00832* (2013.01); *H04N 2201/0039* (2013.01); *H04N 2201/0094* (2013.01)

(58) Field of Classification Search
USPC .............................................. 358/1.13–1.15
See application file for complete search history.

(56) References Cited

U.S. PATENT DOCUMENTS

2010/0231963 A1* 9/2010 Oda ................... G03G 15/5012
358/1.15
2011/0032565 A1* 2/2011 Akimoto ............... G06F 3/1213
358/1.15

FOREIGN PATENT DOCUMENTS

JP    2014-076582    5/2014

* cited by examiner

*Primary Examiner* — Saeid Ebrahimi Dehkord
(74) *Attorney, Agent, or Firm* — James Judge

(57) ABSTRACT

An image forming system includes a print device, a print job accepting circuit, an interrupt permission circuit, and a distance acquisition circuit. The interrupt permission circuit permits the interrupt print with a count of paper sheets equal to or less than a count of printable sheets printed by the print device within an interruptible time that ensures execution of the interrupt print, within an acceptable extension time by which an extension of completion time of the interrupted print job is accepted. The interrupt permission circuit calculates the acceptable extension time based on a remaining count of printed sheets of the print job to be interrupted. The interrupt permission circuit calculates the interruptible time by at least reducing an arrival time taken to arrive at the printer for the requester arrives at the print device based on a distance acquired by the distance acquisition circuit from the acceptable extension time.

8 Claims, 9 Drawing Sheets

| Order | Print Job | State |
|---|---|---|
| 1 | JOB_A | In Execution |
| 2 | JOB_B | In Standby |
| 3 | JOB_C | In Standby |

| Order | Print Job | State |
|---|---|---|
| 1 | JOB_A | In Execution |
| 2 | JOB_B | In Standby |
| 3 | JOB_C | In Standby |
| 4 | JOB_D | In Standby |

| Order | Print Job | State |
|---|---|---|
| 1 | JOB_E | In Execution |
| 2 | JOB_A | Temporary Stop |
| 3 | JOB_B | In Standby |
| 4 | JOB_C | In Standby |

FIG. 8

| Order | Print Job | State |
|---|---|---|
| 1 | JOB_E | In Execution |
| 2 | JOB_F | In Standby |
| 3 | JOB_A | Temporary Stop |
| 4 | JOB_B | In Standby |
| 5 | JOB_C | In Standby |

50

IMAGE FORMING SYSTEM THAT APPROPRIATELY PERMITS INTERRUPT PRINT, AND RECORDING MEDIUM

INCORPORATION BY REFERENCE

This application is based upon, and claims the benefit of priority from, corresponding Japanese Patent Application No. 2015-072674 filed in the Japan Patent Office on Mar. 31, 2015, the entire contents of which are incorporated herein by reference.

BACKGROUND

Unless otherwise indicated herein, the description in this section is not prior art to the claims in this application and is not admitted to be prior art by inclusion in this section.

There is known a system that permits interrupt print when a distance from a requester of interrupt print to a print device is equal to or less than a threshold as a typical image forming system that executes the interrupt print.

SUMMARY

An image forming system according to an aspect of the disclosure includes a print device that operates to execute a print job, a print job accepting circuit that accepts the print job, an interrupt permission circuit that permits interrupt print, and a distance acquisition circuit that acquires a distance from a requester of the interrupt print to the print device. The interrupt permission circuit permits, when the print job accepting circuit accepts a print job of the interrupt print, the interrupt print with a count of paper sheets equal to or less than a count of printable sheets printed by the print device within an interruptible time that ensures execution of the interrupt print, within an acceptable extension time by which an extension of completion time of the print job to be interrupted due to the interrupt print is accepted. The interrupt permission circuit calculates the acceptable extension time based on a remaining count of printed sheets of the print job to be interrupted. The interrupt permission circuit calculates the interruptible time by at least reducing an arrival time taken for the requester to arrive at the print device based on a distance acquired by the distance acquisition circuit from the acceptable extension time.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIGS. 3A to 3C illustrate an exemplary print queue managed by a print job accepting unit according to the embodiment.

FIG. 8 illustrates an exemplary print queue managed by the print job accepting unit according to the embodiment, which is different from the example illustrated in FIGS. 3A to 3C.

DETAILED DESCRIPTION

Figure 1:
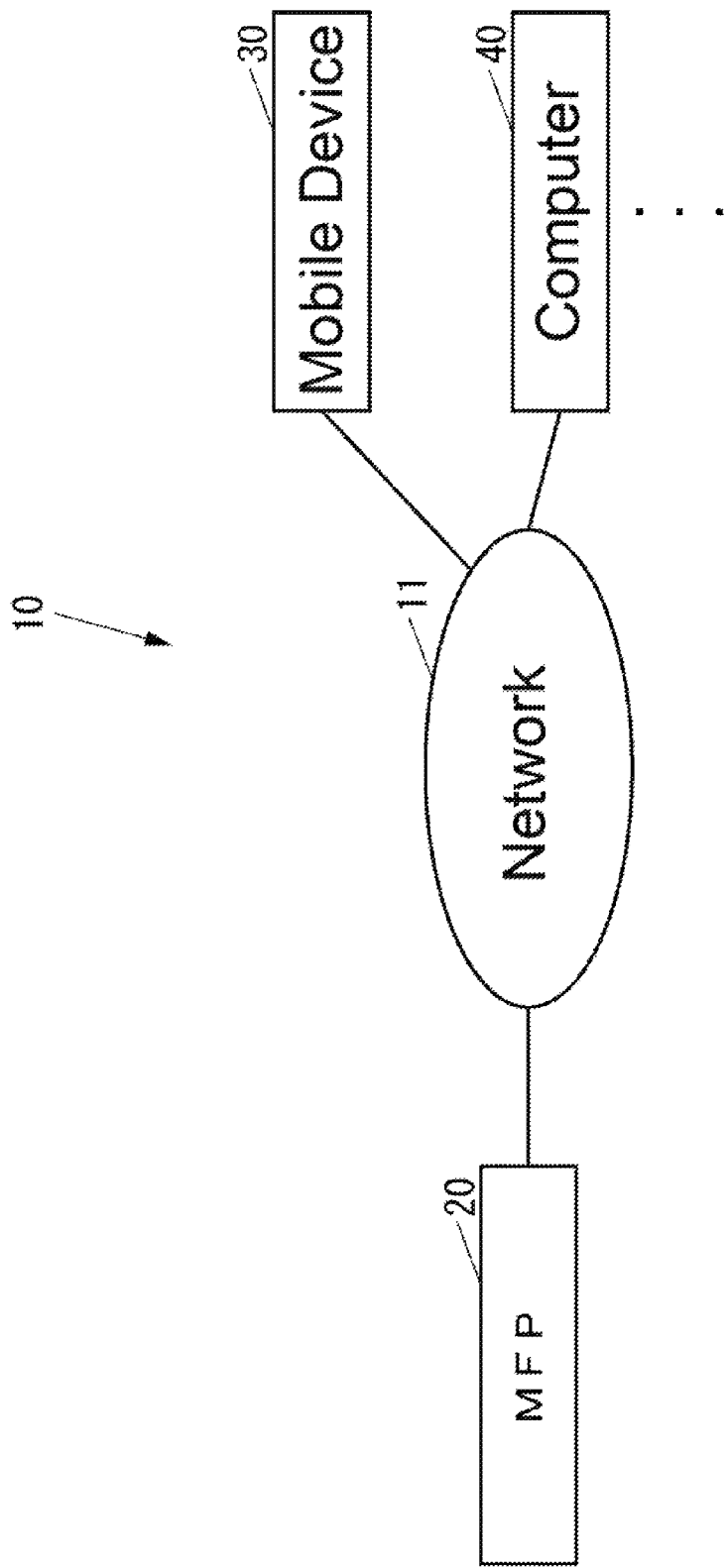
FIG. 1 illustrates a system according to an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure with reference to the drawings.

First, the following describes a configuration of a system according to the embodiment.

FIG. 1 illustrates a system 10 according to the embodiment.

As illustrated in FIG. 1, the system 10 includes a multi-function peripheral (MFP) 20 as an image forming system, a mobile device 30 and a computer 40.

The mobile device 30 is constituted by, for example, a smart phone and a tablet. The mobile device 30 includes, for example, a global positioning system (GPS) receiver, which enables the mobile device 30 to acquire a location of the mobile device 30 itself.

The computer 40 is constituted by, for example, a personal computer PC).

The mobile device 30 and the computer 40 are used by an identical user.

While the system 10 includes many mobile devices and computers other than the mobile device 30 and the computer 40 for respective users, the following description omits the mobile device and the computer other than the mobile device 30 and the computer 40 for ease of understanding.

The MFP 20 is communicatively connected to the mobile device 30 and the computer 40 via a network 11 such as a local area network (LAN) and an Internet.

Figure 2:
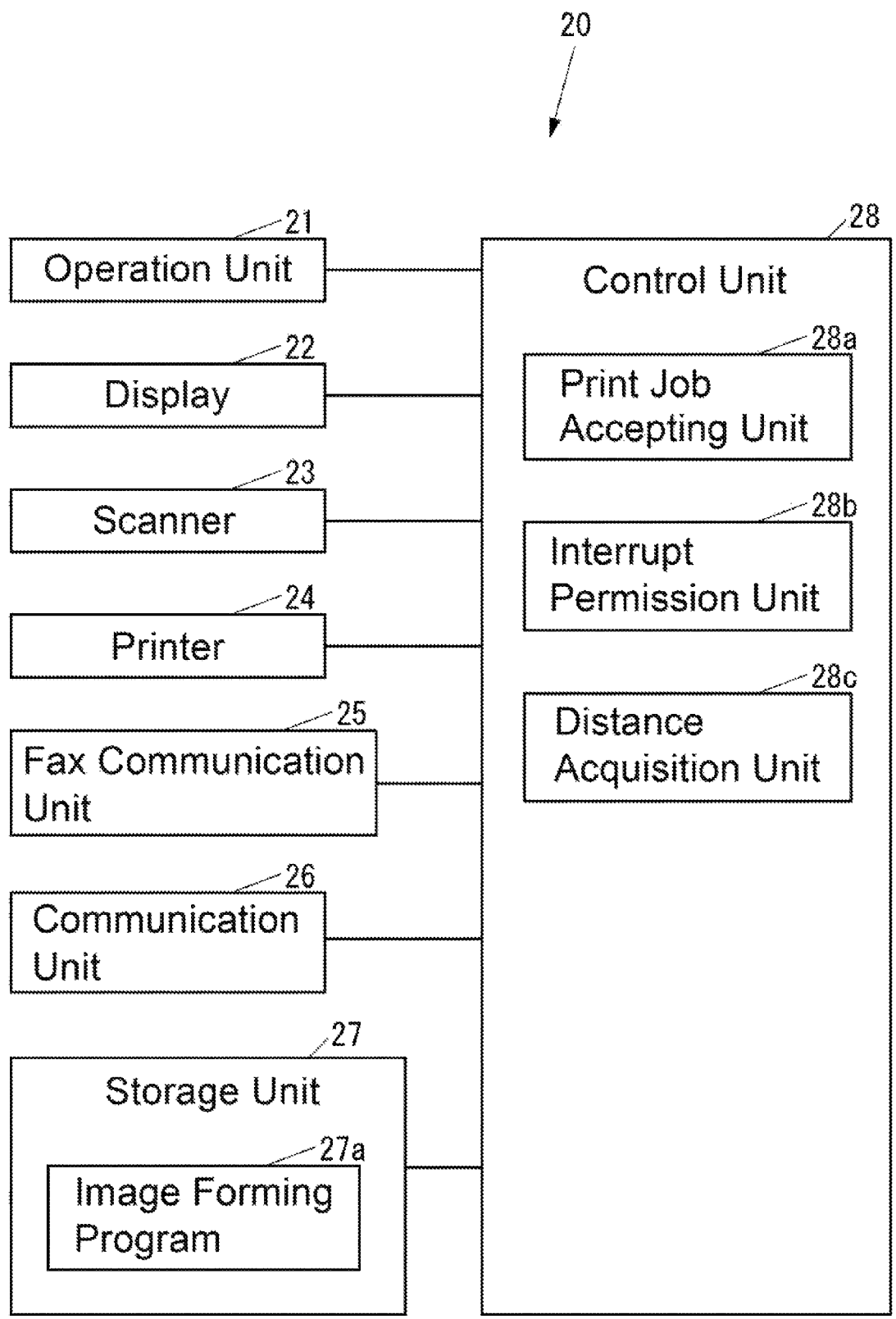
FIG. 2 illustrates an MFP according to the embodiment.

FIG. 2 illustrates the MFP 20.

The MFP 20 includes an operation unit 21, a display 22, a scanner 23, a printer 24, a fax communication unit 25, a communication unit 26, a storage unit 27, and a control unit 28 as illustrated in FIG. 2. The operation unit 21 is an input device such as a button, which receives various operations. The display 22 is a display device such as a liquid crystal display (LCD), which displays various types of information. The scanner 23 is a reading device, which reads an image from a document. The printer 24 is a print device, which includes a mechanism that executes print on a recording medium such as a paper sheet and a processor that operates this mechanism. The fax communication unit 25 is a fax device, which performs fax communication with an external facsimile device (not illustrated) via a communication line such as a dial-up line. The communication unit 26 is a network communication device, which communicates with an external device via the network 11 (see FIG. 1). The storage unit 27 is a non-volatile storage device such as an electrically erasable programmable read only memory (EEPROM) and a hard disk drive (HDD), which store various types of information. The control unit 28 controls the entire MFP 20.

The storage unit 27 has an area that stores programs and data. The storage unit 27 stores an image forming program 27a to control the MFP 20. The image forming program 27a may have been installed on the MFP 20 at the production stage of the MFP 20. The image forming program 27a may be additionally installed from an external storage medium such as an SD card and a universal serial bus (USB) memory on the MFP 20, or may also be additionally installed on the MFP 20 via the network 11.

The control unit 28 includes, for example, a central processing unit (CPU), a read only memory (ROM) that stores programs and various kinds of data, and a random access memory (RAM) used as a work area of the CPU. The CPU executes the programs stored in the ROM or the storage unit 27.

The control unit 28 executes the image forming program 27a stored in the storage unit 27. This causes the control unit 28 to operate as a print job accepting unit 28a (also referred to as a print job accepting circuit), an interrupt permission unit 28b (also referred to as an interrupt permission circuit), and a distance acquisition unit 28c (also referred to as a distance acquisition circuit). The print job accepting unit 28a accepts a print job. The interrupt permission unit 28b permits interrupt print when the print job accepting unit 28a accepts a print job of the interrupt print. The distance acquisition unit 28c acquires a distance from a requester of the interrupt print to the printer 24. The print job accepting unit 28a, the interrupt permission unit 28b, and the distance acquisition unit 28c may include processors such as a central processing unit (CPU), which has one or more circuits, load various programs to execute, and also execute various programs incorporated inside in advance. Here, the circuit may be an electronic component, to which a plurality of electronic elements are connected through wiring, or an electronic substrate, to which a plurality of electronic components are connected.

FIGS. 3A to 3C illustrate an exemplary print queue 50 managed by the print job accepting unit 28a.

As illustrated in FIG. 3A, when a "JOB_A," a "JOB_B," and a "JOB_C" as print jobs are present in the print queue 50, a print job that is executed first in an execution order, that is, the "JOB_A" is in execution by the printer 24. The print jobs that are executed other than first in the execution order, that is, the "JOB_B" and the "JOB_C" are in standby. Here, as illustrated in FIG. 3B, after the print job accepting unit 28a accepts a "JOB_D" as an ordinary print job, the "JOB_D" is added as the print job that is executed last in the execution order in the print queue 50. Meanwhile, as illustrated in FIG. 3C, after the print job accepting unit 28a accepts a "JOB_E" as a print job of the interrupt print, the "JOB_E" is added as the print job that is executed first in the execution order in the print queue 50. The execution of the "JOB_A," which is in execution in FIG. 3A, is temporarily stopped in FIG. 3C. Then, after the execution of the "JOB_E" is terminated, and the execution order of the "JOB_A" becomes the first order, the execution of the "JOB_A" resumes.

Next, the following describes operations of the system 10.

First, the following describes operations of the computer 40 when the print job is transmitted to the MFP 20.

Figure 4:
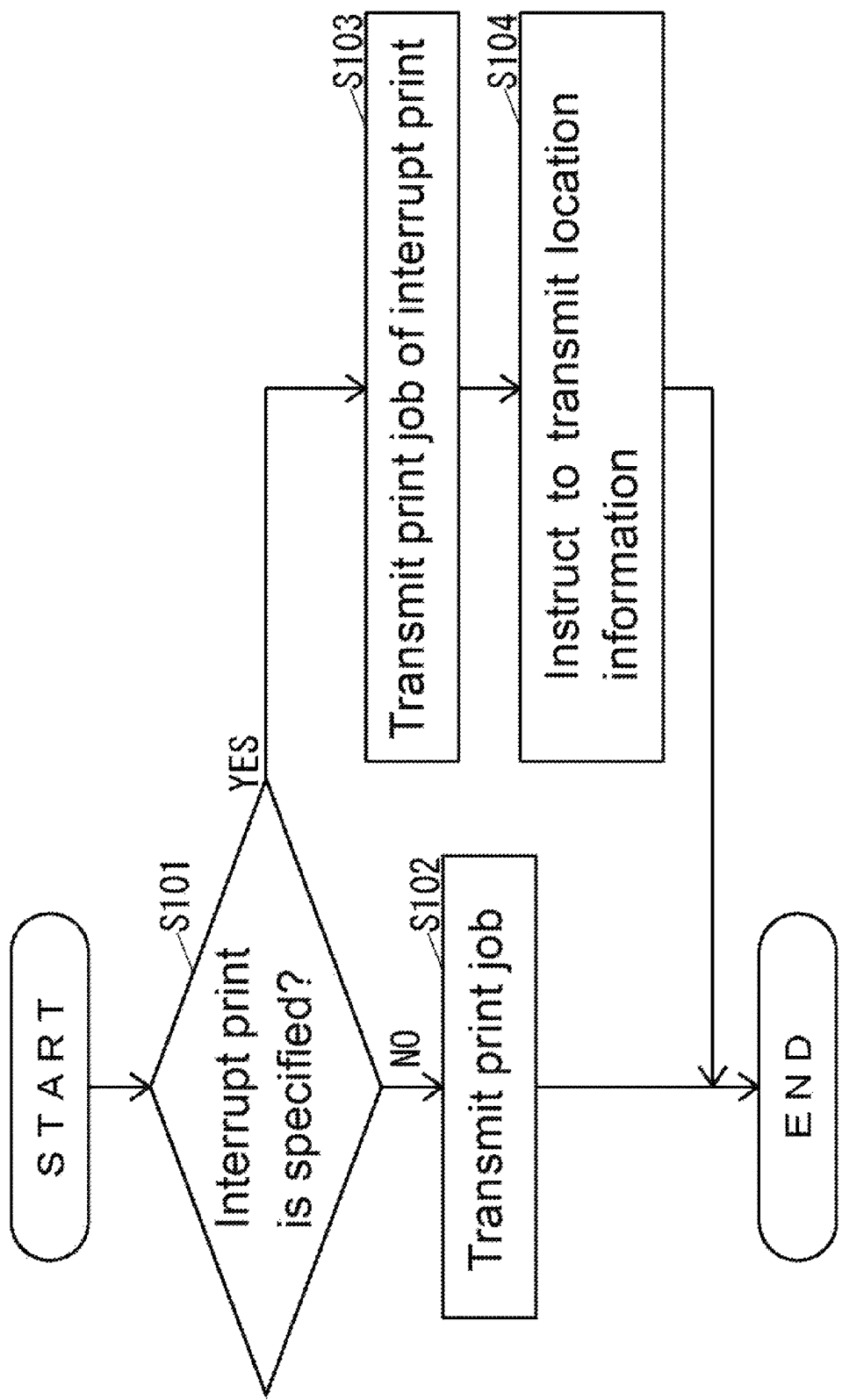
FIG. 4 illustrates operations of a computer according to the embodiment when a print job is transmitted to the MFP.

FIG. 4 illustrates the operations of the computer 40 when the print job is transmitted to the MFP 20. Additionally, an alphabet S attached before a numeral in the flowchart means a step.

As illustrated in FIG. 4, after the user instructs the computer 40 to transmit the print job to the MFP 20, the computer 40 determines whether or not the print job including an instruction to be transmitted to the MFP 20 is specified as the interrupt print (S101).

In S101, after the computer 40 determines that the interrupt print is not specified, the computer 40 transmits the print job instructed by the user to the MFP 20 (S102), and then terminates the operations illustrated in FIG. 4.

In S101, after the computer 40 determines that the interrupt print is specified, the computer 40 transmits the print job instructed by the user as the print job of the interrupt print to the MFP 20 (S103), instructs the mobile device 30 to transmit location information to the MFP 20 (S104), and then terminates the operations illustrated in FIG. 4. The mobile device 30 transmits present-location information of the mobile device 30 itself to the MFP 20 in response to this instruction.

The print job of the interrupt print to be transmitted to the MFP 20 from the computer 40 and the location information to be transmitted to the MFP 20 from the mobile device 30 include, for example, information associated one another such as a user ID as identification information of the user. This causes the MFP 20 to recognize that the print job transmitted from the computer 40 and the location information transmitted from the mobile device 30 are associated one another.

While the mobile device 30 transmits the location information to the MFP 20 in the description described above, the computer 40 may acquire the location information from the mobile device 30, associate the location information acquired with the print job of the interrupt print one another, and then transmit the information to the MFP 20.

Next, the following describes operations of the MFP 20 when the print job is received from the computer 40.

Figure 5:
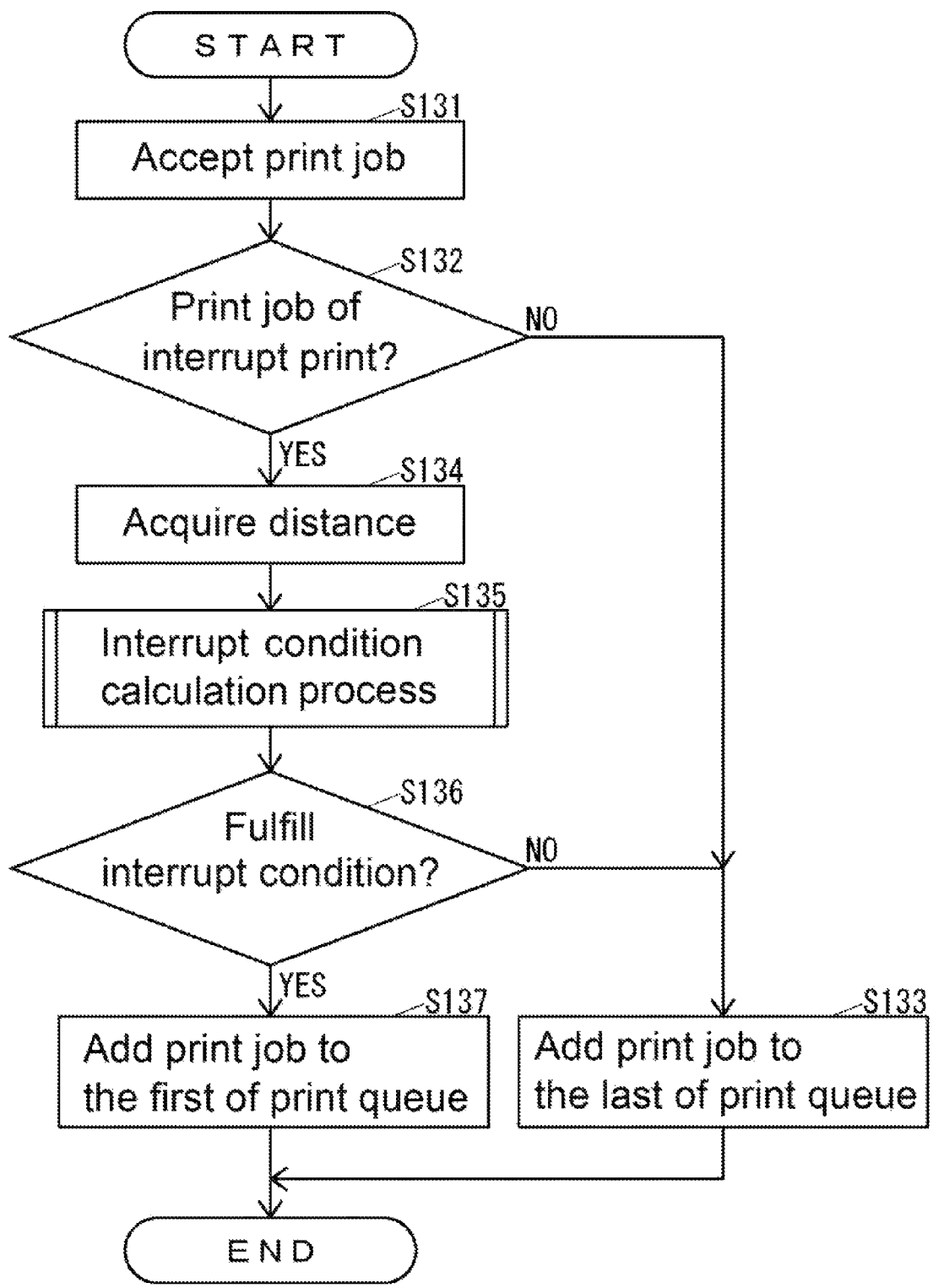
FIG. 5 illustrates operations of the MFP according to the embodiment when the print job is received from the computer.

FIG. 5 illustrates the operations of the MFP 20 when the print job is received from the computer 40.

As illustrated in FIG. 5, after the print job accepting unit 28a in the MFP 20 accepts the print job received via the communication unit 26 (S131), the print job accepting unit 28a determines whether or not the print job accepted is the print job of the interrupt print (S132).

In S132, after the print job accepting unit 28a determines that the print job accepted is not the print job of the interrupt print, the print job accepting unit 28a adds the print job to the last of the print queue 50 as illustrated in FIG. 3B (S133) and terminates the operations illustrated in FIG. 5.

In S132, after the print job accepting unit 28a determines that the accepted print job is a print job of the interrupt print, the distance acquisition unit 28c acquires the received location information, which is associated with the print job of the interrupt print, and a distance from a location of the mobile device 30, namely, a location of the requester of the interrupt print to a location of the printer 24, namely, a location of the MFP 20 based on the location information of the MFP 20 (S134).

Figure 6:
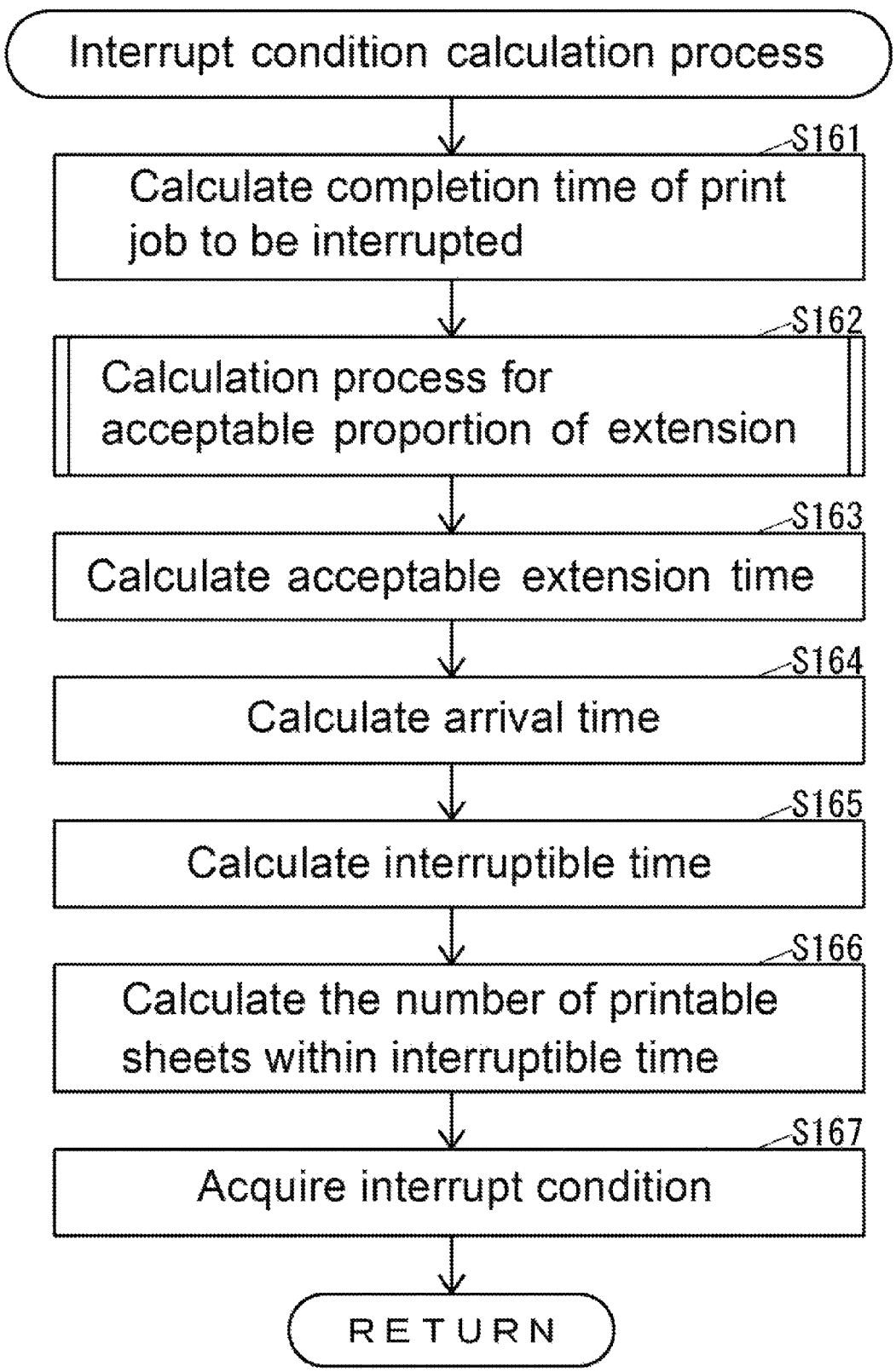
FIG. 6 illustrates an interrupt condition calculation process according to the embodiment.

After that, the interrupt permission unit 28b executes an interrupt condition calculation process illustrated in FIG. 6 to calculate an interrupt condition (S135).

FIG. 6 illustrates the interrupt condition calculation process according to the embodiment.

As illustrated in FIG. 6, the interrupt permission unit 28b calculates a time required for the printer 24 to print the remaining number of printed sheets of the print job to be interrupted, that is, a completion time of the print job to be interrupted based on the remaining number of printed sheets of the print job to be interrupted and a printing speed of the MFP 20 (S161).

For example, when the remaining number of printed sheets of the print job to be interrupted is 100 sheets, and the printing speed of the MFP 20 is 0.5 sheets/second, the interrupt permission unit 28*b* calculates the completion time of the print job to be interrupted as 200 seconds later using the following formula.

100 sheets÷0.5 sheets/second=200 seconds

The printing speed is a value that depends on a model of the MFP 20.

Figure 7:
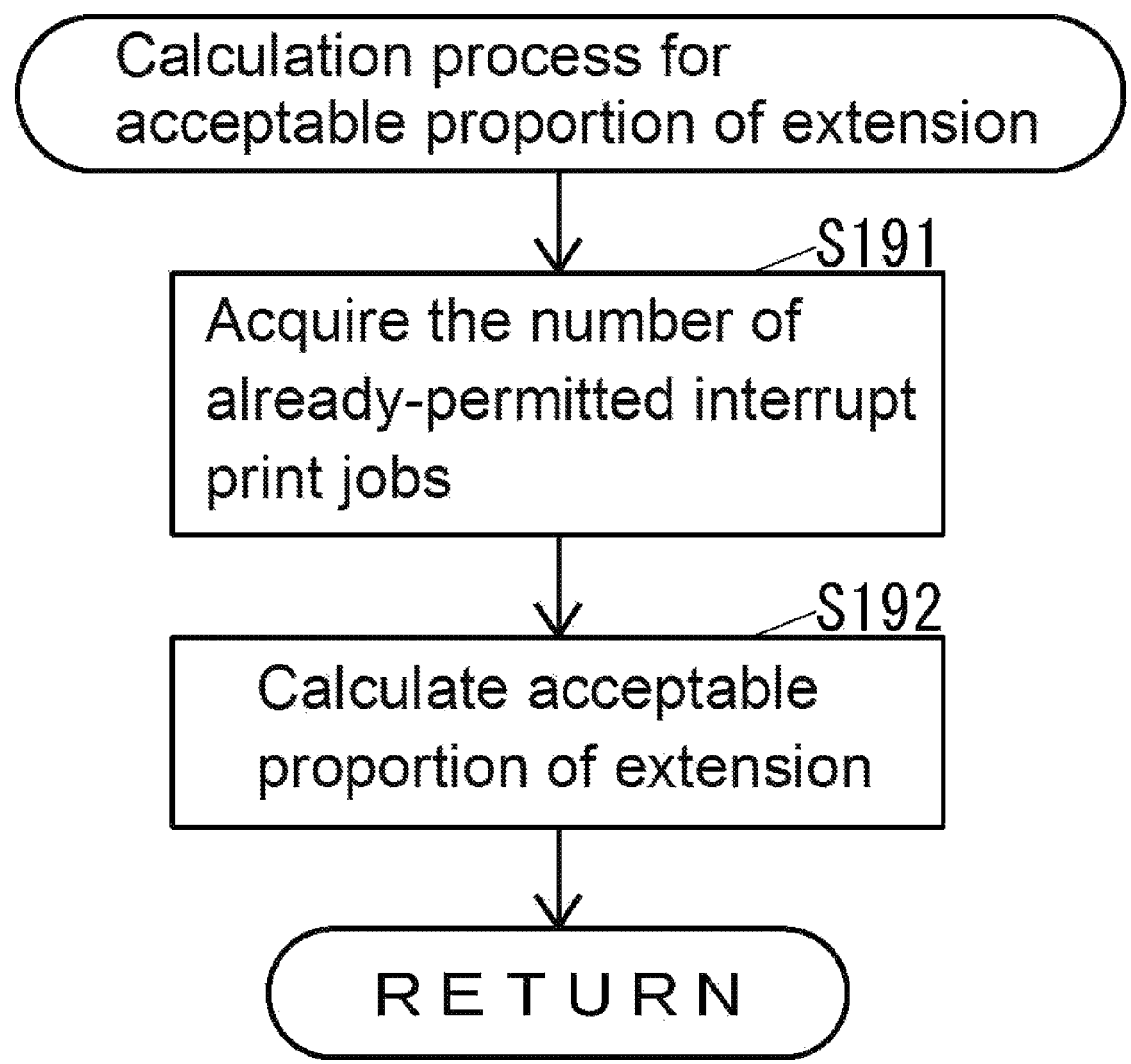
FIG. 7 illustrates a calculation process for an acceptable proportion of extension according to the embodiment.

After the process in S161, the interrupt permission unit 28*b* executes a calculation process for an acceptable proportion of extension illustrated in FIG. 7 to calculate an acceptable proportion of extension that accepts an extension of the completion of the print job to be interrupted due to the interrupt print (S162).

FIG. 7 illustrates the calculation process for the acceptable proportion of the extension according to the embodiment.

As illustrated in FIG. 7, the interrupt permission unit 28*b* acquires the number of already-permitted print jobs as the interrupt print for the print job to be interrupted (S191). For example, when the print queue 50 is in the state illustrated in FIG. 3A, the interrupt permission unit 28*b* acquires "0" as the number of the already-permitted print jobs as the interrupt print because a print job of the interrupt print for the "JOB_A," which is the print job to be interrupted, is not permitted yet. When the print queue 50 is in the state illustrated in FIG. 3C, the interrupt permission unit 28*b* acquires "1" as the number of the already-permitted print jobs as the interrupt print because the "JOB_E" as one print job of the interrupt print for the "JOB_A," which is the print job to be interrupted, is permitted. When the print queue 50 is in the state illustrated in FIG. 8, the interrupt permission unit 28*b* acquires "2" as the number of the already-permitted print jobs as the interrupt print because the "JOB_E" and a "JOB_F" as two print jobs as the interrupt print for the "JOB_A," which is a print job to be interrupted, are permitted.

The "JOB_F" is a print job of the interrupt print that is permitted after the "JOB_E" in FIG. 8. When a plurality of the print jobs as the interrupt print are permitted, this interrupt print is executed in a permitted order.

When the interrupt permission unit 28*b* acquires the number of the already-permitted print jobs as the interrupt print for the print job to be interrupted, the number of the already-permitted print jobs as the interrupt print for the print job to be interrupted includes the number of the print jobs as the interrupt print that has been already completed at the point of S191, within the number of the already-permitted print jobs as the interrupt print for the print job to be interrupted.

As illustrated in FIG. 7, after the process in S191, the interrupt permission unit 28*b* calculates an acceptable proportion of extension based on the number acquired in S191 and a basic acceptable proportion of extension using the following formula (S192), and then terminates the calculation process for the acceptable proportion of the extension illustrated in FIG. 7. In the following formula, P is the acceptable proportion of the extension calculated in S192, Ps is the basic acceptable proportion of the extension, and N is the number acquired in S191. Thus, the acceptable proportion (also referred to as a specific proportion) decreases corresponding to the number of the already-permitted print jobs as the interrupt print for the print job to be interrupted.

$$P=Ps \div 2^N$$

For example, when the basic acceptable proportion of the extension is 10%, the interrupt permission unit 28*b* calculates as follows: the interrupt permission unit 28*b* calculates the acceptable proportion of the extension as 10% in S192 when the number of the already-permitted print jobs as the interrupt print is "0"; the interrupt permission unit 28*b* calculates the acceptable proportion of the extension as 5% in S192 when the number of the already-permitted print jobs as the interrupt print is "1"; and the interrupt permission unit 28*b* calculates the acceptable proportion of the extension as 2.5% in S192 when the number of the already-permitted print jobs as the interrupt print is "2."

An administrator of the MFP 20, for example, is allowed to change the basic acceptable proportion of the extension. For example, the basic acceptable proportion of the extension may be around 10% to 20%.

After the calculation process for the acceptable proportion of the extension in S162, the interrupt permission unit 28*b* calculates an acceptable extension time, which accepts an extension of the completion time of the print job to be interrupted due to the interrupt print, based on the completion time calculated in S161 and the acceptable proportion of the extension calculated in S162 (S163).

For example, when the completion time calculated in S161 is 200 seconds, and the acceptable proportion of the extension calculated in S162 is 10%, the interrupt permission unit 28*b* calculates the acceptable extension time as 20 seconds using the following formula.

200 seconds×10%=20 seconds

The interrupt permission unit 28*b* calculates an arrival time taken to arrive at the printer 24 for the requester of the interrupt print based on the distance acquired in S134 and an average speed of a human walking after the process in S163 (S164).

For example, when the distance acquired in S134 is 5 m, and the average speed of the human walking is 1.33 m/seconds, the interrupt permission unit 28*b* calculates the arrival time as 3.76 seconds using the following formula.

5 m÷1.33 m/second≈3.76 seconds

The interrupt permission unit 28*b* calculates an interruptible time that ensures an execution of the interrupt print within the acceptable extension time based on the acceptable extension time calculated in S163, the arrival time calculated in S164, and a switching period of the print job switched by the printer 24 after the process in S164 (S165).

For example, when the acceptable extension time calculated in S163 is 20 seconds, the arrival time calculated in S164 is 3.76 seconds, and the switching period is 5 seconds, the interrupt permission unit 28*b* calculates the interruptible time as 11.24 seconds using the following formula.

20 seconds−3.76 seconds−5 seconds=11.24 seconds

The switching period is a value that depends on models of the MFP 20. The switching period may include not only a switching period immediately before the interrupt print but also a switching period immediately after the interrupt print.

The interrupt permission unit 28*b* calculates the number of printable sheets printed by the printer 24 within the interruptible time based on the interruptible time calculated in S165 and the printing speed of the MFP 20 after the process in S165 (S166).

For example, when the interruptible time calculated in S165 is 11.24 seconds, and the printing speed of the MFP 20 is 0.5 sheets/second, the interrupt permission unit 28b calculates the number of the printable sheets as 5 sheets using the following formula.

11.24 seconds×0.5 sheets/second=5.62 sheets

The interrupt permission unit 28b employs that the number of printed sheets of a print job as the interrupt print is equal to or less than the number of paper sheets calculated in S166, as an interrupt condition (S167), and then terminates the interrupt condition calculation process illustrated in FIG. 6 after the process in S166.

As illustrated in FIG. 5, the interrupt permission unit 28b determines whether or not the print job of the interrupt print fulfills the interrupt condition calculated in S135 after the interrupt condition calculation process in S135 (S136). For example, when the interrupt condition is equal to or less than 5 sheets while the print job of the interrupt print has equal to or less than 5 sheets, the interrupt permission unit 28b determines that the interrupt condition is fulfilled.

After the interrupt permission unit 28b determines that the interrupt condition is not fulfilled in S136, as illustrated in FIG. 3B, the print job accepting unit 28a adds the print job to the last of the print queue 50 (S133), and then terminates the operation illustrated in FIG. 5.

When the interrupt permission unit 28b determines that the interrupt condition is fulfilled in S136, that is, the interrupt permission unit 28b permits the interrupt print, the print job accepting unit 28a adds the print job to the first of the print queue 50 as illustrated in FIG. 3C (S137), and then terminates the operation illustrated in FIG. 5. In this case, the printer 24 executes the interrupt print for the print job, which is newly added in S137.

As described above, the MFP 20 permits the print job of the interrupt print based on the remaining number of printed sheets of the print job to be interrupted, the distance from the requester of the interrupt print to the printer 24, and the number of printed sheets of the interrupt print (S135 and YES at S136). This ensures appropriate permission for the interrupt print.

Namely, the more the number of printed sheets of the print job to be interrupted is, the more easily the MFP 20 permits the interrupt print. That is because the more the number of printed sheets of the print job to be interrupted is, the less possibly the requester of the print job to be interrupted continues waiting for the completion of the print job near the printer 24.

The closer the distance from the requester of the interrupt print to the printer 24 is, the more easily the MFP 20 permits the interrupt print. That is because the closer the distance from the requester of the interrupt print to the printer 24 is, the more possibly the requester of the interrupt print desires a prompt execution of the print job of the interrupt print.

When the number of printed sheets of the interrupt print is few, the MFP 20 permits the interrupt print. The few number of printed sheets of the interrupt print prevents an excessively late completion time of the print job to be interrupted.

The MFP 20 ensures further appropriate permission for the interrupt print because the MFP 20 permits the interrupt print based on a switching period for which the printer 24 switches between the print jobs in addition to the remaining number of printed sheets of the print job to be interrupted, a distance from the requester of the interrupt print to the printer 24 and the number of printed sheets of the print job of the interrupt print. For example, when the completion time of the print job to be interrupted is excessively late in consideration of the switching period of the print job by the printer 24, even the distance from the requester of the interrupt print to the printer 24 is close, the MFP 20 does not permit the interrupt print.

After the MFP 20 accepts the plurality of the print jobs as the interrupt print for one print job to be interrupted, the later the print job of the interrupt print is accepted, the severer permission condition becomes (S162). Thus, the MFP 20 ensures appropriate permission for the plurality of the interrupt prints while preventing an excessively late completion of the print job to be interrupted.

While in the above-described embodiment the mobile device 30 or the computer 40 actively transmits the location information to the MFP 20 when the computer 40 transmits the print job of the interrupt print to the MFP 20, the MFP 20 may actively acquire the location information from the mobile device 30 associated with the computer 40 directly or via the computer 40 indirectly when the computer 40 transmits the print job of the interrupt print.

While in the embodiment the system 10 includes the mobile device 30 and the computer 40, the system 10 does not have to include the computer 40 when the mobile device 30 requests the interrupt print from the MFP 20, and does not have to include the mobile device 30 when the computer 40 transmits location information of the computer 40 as location information on the requester of the interrupt print to the MFP 20.

While in the embodiment the image forming system of the disclosure employs an MFP, the image forming system may employ an image forming apparatus other than MFP, for example, a printer-only machine.

While the image forming system of the disclosure is an MFP alone in the embodiment, the image forming system may be constituted of the image forming apparatus and a server. When the image forming system is constituted of the image forming apparatus and the server, the server achieves a part of functions of the MFP according to the embodiment.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming system, comprising:
a print device that operates to execute a print job;
a memory storing an image forming program; and
a processor that executes the image forming program;
wherein
when the processor executes the image forming program, the processor
accepts the print job,
if the accepted print job is for an interrupt print, acquires a distance from a requester of the interrupt print to the print device,
calculates, based on a remaining count of printed sheets of the print job being interrupted due to the interrupt print, an acceptable extension time by which an extension of completion time of the print job being interrupted is accepted,
calculates an interruptible time ensuring that the interrupt print is executable, with respect to the accepted print job for an interrupt print, by at least subtracting from the acceptable extension time arrival time taken for the requester to arrive at the print device, calculated based on the acquired distance, and permits an interrupt print with a count of paper sheets equal to or less than a count of printable sheets printed by the print device within the interruptible time during the acceptable extension time; and the print device executes the print job for the interrupt print permitted by the processor.

2. The image forming system according to claim 1, wherein the processor executing the image forming program calculates the interruptible time by at least subtracting not only the arrival time but also a switching period during which the print device switches between print jobs, from the acceptable extension time.

3. The image forming system according to claim 1, wherein the processor executing the image forming program:

multiplies by a specific proportion time required for the remaining count of the printed sheets of the interrupted print job to be printed by the print device, so as to calculate the acceptable extension time; and reduces the specific proportion by the extent that a count of already-permitted interrupt-print print jobs is large with respect to the print job being interrupted.

4. The image forming system according to claim 3, wherein the already permitted interrupt-print print jobs are already permitted with respect to the print job being interrupted, and include one or more completed interrupt-print print jobs and one or more uncompleted interrupt-print print jobs.

5. A non-transitory computer-readable recording medium storing an image forming program to control an image forming apparatus including a processor, and a print device that executes a print job, the image forming program causing the image forming apparatus's processor to:

accept the print job;

if the accepted print job is for an interrupt print, acquire a distance from a requester of the interrupt print to the print device;

calculate, based on a remaining count of printed sheets of the print job being interrupted due to the interrupt print, an acceptable extension time by which an extension of completion time of the print job being interrupted due to the interrupt print is accepted;

calculate an interruptible time ensuring that the interrupt print is executable, with respect to the accepted print job for an interrupt print, by at least subtracting from the acceptable extension time arrival time taken for the requester to arrive at the print device, calculated based on the acquired distance;

permit an interrupt print with a count of paper sheets equal to or less than a count of printable sheets printed by the print device within the interruptible time during the acceptable extension time; and the image forming program causing the print device to execute the print job for the interrupt print permitted by the processor.

6. The non-transitory computer-readable recording medium according to claim 5, wherein the image forming program further causes the image forming apparatus's processor to calculate the interruptible time by at least subtracting not only the arrival time but also a switching period during which the print device switches between print jobs, from the acceptable extension time.

7. The non-transitory computer-readable recording medium according to claim 5, wherein the image forming program further causes the image forming apparatus's processor to:

multiply by a specific proportion time required for the remaining count of the printed sheets of the interrupted print job to be printed by the print device, so as to calculate the acceptable extension time; and reduce the specific proportion by the extent that a count of already-permitted interrupt-print print jobs is large with respect to the print job being interrupted.

8. The non-transitory computer-readable recording medium according to claim 7, wherein the already permitted interrupt-print print jobs are already permitted with respect to the print job being interrupted, and include one or more completed interrupt-print print jobs and one or more uncompleted interrupt-print print jobs.

* * * * *